United States Patent
Podubrin et al.

(10) Patent No.: US 6,310,106 B1
(45) Date of Patent: Oct. 30, 2001

(54) METHOD FOR DEMULSIFYING EMULSIONS

(75) Inventors: Stefan Podubrin, Muelheim; Wolfgang Breuer, Korschenbroich; Claus-Peter Herold, Mettmann; Andreas Heidbreder, Duesseldorf; Thomas Foerster, Erkrath; Martina Hollenbrock, Duesseldorf, all of (DE)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 09/485,269

(22) PCT Filed: Jul. 25, 1998

(86) PCT No.: PCT/EP98/04668

§ 371 Date: May 12, 2000

§ 102(e) Date: May 12, 2000

(87) PCT Pub. No.: WO99/07808

PCT Pub. Date: Feb. 18, 1999

(30) Foreign Application Priority Data

Aug. 6, 1997 (DE) ............................................... 197 33 977

(51) Int. Cl.⁷ ........................... B01D 17/05; C10G 33/04
(52) U.S. Cl. ......................... 516/189; 210/708; 208/188
(58) Field of Search ........................... 516/189; 210/708; 208/188

(56) References Cited

U.S. PATENT DOCUMENTS

| | | | |
|---|---|---|---|
| 2,307,058 | * 1/1943 | Moeller | 516/189 |
| 2,307,494 | * 1/1943 | De Groote et al. | 516/189 |
| 2,470,808 | * 5/1949 | De Groote et al. | 516/189 |
| 2,864,810 | * 12/1958 | Batdorf | 516/189 |
| 3,061,620 | 10/1962 | Kirkpatrick et al. | 560/127 |
| 3,066,159 | 11/1962 | Groote et al. | 554/61 |
| 3,928,194 | 12/1975 | Tao | 516/146 |
| 5,237,080 | 8/1993 | Daute et al. | 554/213 |
| 5,442,082 | * 8/1995 | Uphues et al. | 554/149 |
| 5,645,762 | * 7/1997 | Cook et al. | 516/189 |
| 5,759,409 | 6/1998 | Knauf et al. | 210/708 |
| 6,057,375 | * 5/2000 | Wollenweber et al. | 516/133 |

FOREIGN PATENT DOCUMENTS

| | | |
|---|---|---|
| 39 23 394 | 1/1991 | (DE) . |
| 43 17 046 | 11/1994 | (DE) . |
| 44 18 800 | 12/1995 | (DE) . |
| 751 203 | 1/1997 | (EP) . |
| WO 96/23568 | * 8/1996 | (WO) . |

OTHER PUBLICATIONS

Kim, et al., "Effect of Demulsifier Partitioning on the Destabilization of Water–in–Oil Emulsions", Ind. Eng. Chem. Res., 35 (1996), pp. 1141–1149 (vol. 35, No. 4).

* cited by examiner

Primary Examiner—Daniel S. Metzmaier
(74) Attorney, Agent, or Firm—John E. Drach; Steven J. Trzaska

(57) ABSTRACT

A process for breaking an emulsion into a water phase and an oil phase involving: (a) providing an emulsion containing an oil phase and a water phase; (b) providing an alkoxylated $C_{10-24}$ carboxylic acid ester derived by the addition of ethylene oxide and/or propylene oxide onto a ring opened epoxidized $C_{10-24}$ carboxylic acid triglyceride which is ring opened with a $C_{6-18}$ carboxylic acid; and (c) contacting the emulsion with a demulsifying effective amount of the alkoxylated $C_{10-24}$ carboxylic acid ester. Said process has application on crude oil emulsions.

9 Claims, No Drawings

METHOD FOR DEMULSIFYING EMULSIONS

BACKGROUND OF THE INVENTION

This invention relates to a process for breaking emulsions containing water and oil, preferably aqueous crude oil emulsions.

In the production of crude oils, an increasing amount of water is brought up with the oil as exploitation of the occurrence progresses. Surface-active substances (for example asphaltenes and resins) present in the crude oils emulsify most of the water to form highly stable water-in-oil emulsions. The emulsified water can make up from 0.1 to 90% by weight of the emulsion as a whole. The emulsion water can contain dissolved salts which lead to corrosion problems in the processing of the crude oil or which—as catalyst poisons—can complicate subsequent processing. In addition, the water present in the crude oil leads to increased transportation costs.

Crude oils differ distinctly in their composition according to their origin. In addition, some of the natural emulsifiers present in the crude oils have a complex chemical composition so that specially selected emulsion breakers or demulsifiers have to be used.

The demulsifiers used for aqueous crude oil emulsions are selected from a wide range of different compounds used either individually or in the form of mixtures, for example polyamides, alkylarylsulfonates and phenolic resins (Kim, Y. H., Wasan, D. T., Ind. Eng. Chem. Res. 1996, 35, 1141–1149). DE 44 18 800 A1 claims the use of mixtures of known demulsifiers with polyalkylene glycol ethers for removing water from crude oil. EP 751 203 A2 proposes polymers obtained by reacting certain alkoxylated polyols with aromatic compounds containing reactive groups as demulsifiers. U.S. Pat. No. 3,928,194 describes a number of different classes of compounds as demulsifiers for aqueous crude oil emulsions, including for example glycol esters, fatty acids, fatty add esters, amines, phenolic resins and alkoxylated derivatives thereof.

However, known demulsifiers or mixtures of known demulsifiers are not always satisfactory because separation of the water and oil phases either takes too long or involves an excessive dosage of the demulsifier. In addition, in view of the widely differing composition of crude oils, there is a constant need for improved demulsifiers or demulsifiers adapted to special crude oil qualities.

Accordingly, the problem addressed by the present invention was to provide improved demulsifiers for breaking water-in-oil emulsions which would be suitable in particular for breaking aqueous crude oil emulsions.

It has been found that emulsions containing water and oil can be effectively broken if selected alkoxylation products of carboxylic acid esters are added as demulsifiers to the emulsions.

BRIEF SUMMARY OF THE INVENTION

Accordingly, the present invention relates to a process for breaking emulsions containing water and oil into a water phase and an oil phase by addition of a demulsifier, products of the addition of ethylene oxide and/or propylene oxide onto $C_{10-24}$ carboxylic acid esters containing OH groups being used as demulsifiers.

The process according to the invention is generally suitable for breaking emulsions containing water and oil. It may be used both for emulsions of the oil-in-water type and for emulsions of the water-in-oil type. However, the process is preferably used for separating aqueous crude oil emulsions, i.e. water-in-oil emulsions of which the oil phase exclusively or predominantly contains crude oil.

DETAILED DESCRIPTION OF THE INVENTION

The esters used as demulsifiers in accordance with the invention are known and are described, for example, in DE 3923394 A1 of which the disclosure is also part of the present application.

The demulsifiers used in accordance with the invention may be obtained by conventional organic syntheses, for example from the epoxides of unsaturated oils which are ring-opened with suitable reagents and then reacted with ethylene oxide ardor propylene oxide.

Preferred educts are any OH-free unsaturated $C_{10-24}$ carboxylic acids of natural and/or synthetic origin with at least one or two double bonds in the 9 and/or 13 position, for example 9c-dodecenoic acid, 9c-tetradecenoic acid, 9c-hexadecenoic acid, 9c-octadecenoic acid, 9t-octadecenoic acid, 9c-, 12c-octadecadienoic acid, 9c-, 12c-, 15c-octadecatrienoic acid, 9c-eicosenoic acid and/or 13c-docosedenoic acid and/or mixtures with at least a high content of such unsaturated carboxylic acids. Preferred educts are carboxylic acids containing 16 to 24 carbon atoms and at least one or two double bonds in the 9 and/or 13 position or carboxylic acid mixtures with at least a high content of carboxylic acids containing 16 to 24 carbon atoms and at least one or two double bonds in the 9 ardor 13 position. These may be esterified with alcohols, for example, by conventional synthesis methods. According to the present invention, $C_{10-24}$ carboxylic acid esters containing $C_{2-6}$ polyols as their alcohol component are preferably used. The polyols contain between 2 and 6 OH groups in the molecule. Examples of such polyols are diethylene glycol, pentaerythritol, trimethylol propane and glycerol.

However, naturally occurring OH-free unsaturated $C_{10-24}$ carboxylic acid esters are preferably used for the production of the demulsifiers used in accordance with the invention. Demulsifiers based on $C_{10-24}$ glycerol esters are preferably used in the process according to the invention. Preferred unsaturated glycerol-based $C_{10-24}$ carboxylic acid esters are any mono-, di- or triglycerides which contain at least one or two double bonds in the 9 and/or 13 position of the $C_{10-24}$ carboxylic acid ester, more particularly naturally occurring fats and oils of which the carboxylic acid content is made up predominantly of unsaturated $C_{10-24}$ carboxylic acids containing at least one or two double bonds in the 9 and/or 13 position. Examples of such naturally occurring unsaturated glycerides are olive oil, linseed oil, sunflower oil, soybean oil, safflower oil, peanut oil, cottonseed oil, rapeseed oil, palm oil, lard, tallow and fish oil. Demulsifiers based on soybean oil are particularly preferred.

The unsaturated OH-free $C_{10-24}$ carboxylic acid esters are epoxidized by known methods, for example with per acids or hydrogen peroxide. The iodine values of the epoxidation products obtained are below 20 and preferably below 15. The oxirane rings of the epoxidized $C_{10-24}$ carboxylic acid esters are then opened by reaction with hydrogen or protic compounds, such as water, linear or branched $C_{1-22}$ alkyl and/or alkenyl alcohols or linear or branched and/or unsaturated $C_{1-24}$ carboxylic acids, to form hydroxyl groups. Saturated unbranched $C_{6-18}$ fatty acids are preferably used for ring opening.

The OH-containing $C_{10-24}$ carboxylic acid esters obtainable by this opening of the oxirane rings contain at least one free OH group in the carboxylic acid moiety. Preferred compounds are those which, in the 9/10 or 13/14 position at least, contain a structural unit corresponding to general formula (I):

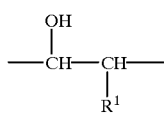

(I)

in which $R^1$ is a hydrogen atom or an OH group. Where alcohols were used to open the oxirane rings, $R^1$ is an $OR^2$ group in which $R^2$ is an alkyl group containing 1 to 22 carbon atoms or an alkenyl group containing 2 to 22 carbon atoms. Where $C_{1-24}$ carboxylic acids were used to open the oxirane rings, $R^2$ is a group $COR^3$ in which $R^3$ is a hydrogen atom, an alkyl group containing 1 to 23 carbon atoms or an alkylene group containing 2 to 23 carbon atoms.

The OH-containing $C_{10-24}$ carboxylic acid esters obtained by opening of the oxirane rings are then reacted with ethylene oxide and/or propylene oxide by known methods. The alkoxylated esters used as demulsfilers in the process according to the invention are preferably obtained by addition of 1.0 to 2.5 parts of ethylene oxide and/or propylene oxide onto 1 part of the non-alkoxylated ester. Products of the addition of 1.5 to 1.8 parts of ethylene oxide and/or propylene oxide onto 1 part of ester are particularly preferred. Esters reacted with ethylene oxide only are preferably used in the process according to the invention.

Esters obtained by addition of ethylene oxide and/or propylene oxide onto epoxidized $C_{10-24}$ carboxylic acid triglycerides, especially soybean oil epoxides, ring-opened with $C_{6-18}$ carboxylic acids are particularly suitable for use as demulsifiers in the process according to the invention.

According to the invention, the emulsions are separated by adding a sufficient quantity of demulsifier—normally between 5 and 1,000 ppm active substance, based on the total quantity of emulsion—to the emulsion. The emulsions then separate automatically into an aqueous phase and an oil phase, generally after a short time, i.e. between 10 and 60 minutes. The temperature of the emulsion can be between 0 and 100° C. In the separation of crude oil emulsions, the demulsifier may be added to the crude oil on site. In that case, demulsification generally proceeds quickly enough, even at the oil production temperature, for the emulsion to separate en route to the preparation stage. Here, it is separated into pure oil and salt water in an optionally heated separator. The demulsification process can be accelerated by stirring the emulsion after addition of the demulsifiers.

To improve their dosability, the demulsifiers may also be used in the form of a solution in suitable solvents. Suitable solvents, are, generally, organic compounds with boiling temperatures of 50 to 200° C., for example methanol. Aromatic compounds, such as toluene or xylene or the mixtures of alkylnaphthalenes marketed by Esso under the name of Solvesso®, are particularly suitable. Where the demulsifiers are used in dissolved form, solutions containing between 0.5 and 50% by weight and preferably between 10 and 40% by weight of the demulsifier are advantageously used for demulsification.

EXAMPLES

Example 1: Production of the Demulsifier

Example 1a 1770 g (7.5 moles, based on epoxide oxygen) of soybean oil epoxide (epoxide oxygen=6.78%) are added with stirring over a period of 1 hour at 150° C. to 1225 g (7.9 moles) of head-fractionated fatty acid (60% $C_8$, 35% $C_{10}$, AV 361.9), followed by reaction for 2 hours at 170° C. (epoxide oxygen <0.15%). To remove the excess fatty acid, the reaction mixture is then distilled in vacuo (469 g distillate) up to a bottom-product temperature of 200° C. The intermediate product is a yellow clear polyol (viscosity 5550 mPas (20° C.); OHV 105, SV 236, AV 3.1).

423 9 (39 parts) of this intermediate product are heated in an autoclave to 100° C. with 6.9 g of a 30% methanolic potassium hydroxide solution, after which the methanol is removed by 5x evacuation and purging with nitrogen as inert gas. A total of 660 g (61 parts) of ethylene oxide is then added in portions at 150° C. so that the pressure does not exceed 5 bar. On completion of the reaction, the reaction mixture is cooled to 80–100° C., evacuated for ca. 15 mins. to remove traces of ethylene oxide and the catalyst is neutralized with lactic acid. A clear yellow liquid with an OHV of 54.7 is obtained in this way.

Example 1b

Another alkoxylated polyol was prepared as described in Example 1a by reacting 350 g (70 parts) of the intermediate product with 150 g (30 parts) of ethylene oxide. OH value 86.

Example 2: Determination of the Demulsifying Effect 90 g of crude oil (Arabian light) were mixed with 10 g tap water and, after the addition of 49.9 ppm (active substance) of demulslfier, the resulting mixture was shaken and its demulsifying effect was subsequently measured.

To measure the demulsifying effect, sedimentation profiles were measured over 40 minutes at room temperature. The amount of free water (in % by weight, based on the total quantity of emulsion) was measured after 10 and 40 minutes at room temperature as was the transparency of the water phase.

The demulsifiers were predissolved in Solvesso® 150 (alkylnaphthalene mixture marketed by Esso) and diluted with toluene to form a 10% by volume solution which was then added to the emulsion. The results are set out in Table 1:

Demulsifiers used
A Dehydem 2F-polyalkylphenol/formaldehyde ethoxylate (Henkel)
Dehypon LT7 -$C_{12-14}$ fatty alcohol+7EO (Henkel)
C alkoxylated ester according to Example 1b
D alkoxylated ester according to Example 1a

TABLE 1

| Demulsifier | Free water after 10 and 40 mins.* [% by weight] | Transparency of the water phase after 10 and 40 mins.** [%] |
| --- | --- | --- |
| A | 0/8 | —/30 |
| B | —/— | —/— |
| C | 0/7 | —/37 |
| D | 2/10 | 2/45 |

*max. 10% by weight
**100% transparency corresponds to pure water

It can be seen that only the use of compound D according to the invention leads to both quick and complete separation of the crude oil emulsions.

What is claimed is:
1. A process for breaking an emulsion into a water phase and an oil phase comprising:

(a) providing an emulsion containing an oil phase and a water phase;

(b) providing an alkoxylated $C_{10-24}$ carboxylic acid ester derived from the addition of ethylene oxide and/or propylene oxide onto a ring opened epoxidized $C_{10-24}$ carboxylic acid triglyceride which is ring opened with a $C_{6-18}$ carboxylic acid; and (c) contacting the emulsion with a demulsifying effective amount of the alkoxylated $C_{10-24}$ carboxylic acid ester.

2. The process of claim 1 wherein the alkoxylated $C_{10-24}$ carboxylic acid ester contains from 1.0 to 2.5 parts by weight of ethylene oxide and/or propylene oxide, per 1 part by weight of non-alkoxylated $C_{10-24}$ carboxylic acid ester.

3. The process of claim 1 wherein the alkoxylated $C_{10-24}$ carboxylic acid ester contains from 1.5 to 1.8 parts by weight of ethylene oxide and/or propylene oxide, per 1 part by weight of non-alkoxylated $C_{10-24}$ carboxylic acid ester.

4. The process of claim 1 wherein the $C_{10-24}$ carboxylic acid ester from which the alkoxylated $C_{10-24}$ carboxylic acid ester is derived contains, in the 9/10 or 13/14 position, a structural unit corresponding to formula (I):

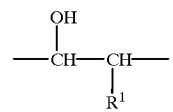

(I)

wherein $R^1$ is $OR^2$ group wherein $R^2$ is $COR^3$ group wherein $R^3$ is an alkyl group containing 5 to 17 carbon atoms.

5. The process of claim 1 wherein the oil phase comprises crude oil.

6. The process of claim 1 wherein the emulsion is contacted with from 5 to 1,000 ppm active substance, of the alkoxylated $C_{10-24}$ carboxylic acid ester.

7. The process of claim 1 wherein the alkoxylated $C_{10-24}$ carboxylic acid ester is present in an organic solvent having a boiling point of from 50 to 200° C.

8. The process of claim 7 wherein the alkoxylated $C_{10-24}$ carboxylic acid ester is present in the solvent in an amount of from 0.5 to 50% by weight.

9. The process of claim 7 wherein the emulsion has a temperature of from 0 to 100° C.

* * * * *